(12) United States Patent
Roennow et al.

(10) Patent No.: US 11,216,542 B2
(45) Date of Patent: Jan. 4, 2022

(54) SENSOR-BASED INTERACTION

(71) Applicant: Nokia Technologies Oy, Espoo (FI)

(72) Inventors: Troels F. Roennow, Cambridge (GB); Kim Blomqvist, Espoo (FI); Khan Baykaner, Cambridgeshire (GB)

(73) Assignee: Nokia Technologies Oy, Espoo (FI)

( * ) Notice: Subject to any disclaimer, the term of this patent is extended or adjusted under 35 U.S.C. 154(b) by 157 days.

(21) Appl. No.: 16/304,296

(22) PCT Filed: Jun. 8, 2016

(86) PCT No.: PCT/FI2016/050406
§ 371 (c)(1),
(2) Date: Nov. 25, 2018

(87) PCT Pub. No.: WO2017/212107
PCT Pub. Date: Dec. 14, 2017

(65) Prior Publication Data
US 2019/0087562 A1    Mar. 21, 2019

(51) Int. Cl.
*H04L 29/06* (2006.01)
*G06F 21/32* (2013.01)
(Continued)

(52) U.S. Cl.
CPC .............. *G06F 21/32* (2013.01); *G06F 21/34* (2013.01); *G06F 21/35* (2013.01); *G06F 21/44* (2013.01);
(Continued)

(58) Field of Classification Search
CPC ...... H04L 63/08; H04L 63/0869; H04L 63/10; H04L 63/0838; H04L 63/0853;
(Continued)

(56) References Cited

U.S. PATENT DOCUMENTS 8,627,438 B1 * 1/2014 Bhimanaik ............. H04L 65/60
726/9
9,264,423 B2    2/2016 Cox
(Continued)

FOREIGN PATENT DOCUMENTS

EP    2743857 A    6/2014
EP    3023908 A1    5/2016
(Continued)

OTHER PUBLICATIONS

"Password-Less Login Via Eye Mounted Wearable", Brentdavidson, Wikipedia, Retrieved on Apr. 28, 2016, Webpage available at: http://brentdavidson.me/password-less-auth-wearable.
(Continued)

*Primary Examiner* — Kristine L Kincaid
*Assistant Examiner* — Shaqueal D Wade-Wright
(74) *Attorney, Agent, or Firm* — Laine IP Oy

(57) ABSTRACT

According to an example aspect of the present invention, there is provided an apparatus comprising a memory configured to store an identifier of the apparatus, at least one processing core configured to obtain, from sensor information, a service identifier and a session identifier, compile a message addressed to a service provider associated with the service identifier, the message comprising the identifier of the apparatus and the session identifier, and cause transmission of the message toward the service provider.

10 Claims, 6 Drawing Sheets

(51) Int. Cl.
  *G06F 21/44* (2013.01)
  *G06F 21/34* (2013.01)
  *H04W 12/06* (2021.01)
  *H04W 12/069* (2021.01)
  *G06Q 20/32* (2012.01)
  *G06F 21/35* (2013.01)

(52) U.S. Cl.
  CPC ............ *G06Q 20/32* (2013.01); *H04L 29/06* (2013.01); *H04L 63/083* (2013.01); *H04L 63/0853* (2013.01); *H04L 63/126* (2013.01); *H04L 63/18* (2013.01); *H04W 12/068* (2021.01); *H04W 12/069* (2021.01)

(58) Field of Classification Search
  CPC ............ H04L 63/0876; H04L 63/0861; H04L 63/0815; H04L 9/32; H04L 9/3226; H04L 9/3247; H04L 9/3223; H04L 9/3228; H04L 9/3234; G06F 21/32; G06F 21/34; H04W 12/0609; H04W 12/0608; H04W 12/06
  See application file for complete search history.

(56) References Cited

U.S. PATENT DOCUMENTS

| | | | |
|---|---|---|---|
| 9,883,388 B2* | 1/2018 | Kim | H04W 76/14 |
| 10,158,646 B1* | 12/2018 | Desai | H04L 63/102 |
| 2011/0219427 A1* | 9/2011 | Hito | G06F 21/00 726/3 |
| 2012/0102552 A1 | 4/2012 | Sammon et al. | |
| 2013/0139222 A1* | 5/2013 | Kirillin | H04L 67/02 726/4 |
| 2013/0167208 A1* | 6/2013 | Shi | H04L 63/08 726/5 |
| 2013/0219479 A1* | 8/2013 | DeSoto | G06Q 20/3276 726/6 |
| 2014/0033286 A1 | 1/2014 | Zhang | |
| 2014/0162601 A1 | 6/2014 | Kim et al. | |
| 2014/0258724 A1 | 9/2014 | Lambert et al. | |
| 2014/0337634 A1 | 11/2014 | Starner et al. | |
| 2015/0304847 A1 | 10/2015 | Gong et al. | |
| 2016/0072803 A1 | 3/2016 | Holz | |
| 2016/0119321 A1 | 4/2016 | Krishnaprasad et al. | |
| 2016/0119324 A1* | 4/2016 | Kaladgi | H04L 63/0815 726/8 |
| 2017/0244676 A1* | 8/2017 | Edwards | H04L 67/141 |
| 2017/0324729 A1* | 11/2017 | Hon | H04W 12/06 |

FOREIGN PATENT DOCUMENTS

| | | |
|---|---|---|
| GB | 2525930 A | 11/2015 |
| WO | 2015/124825 A1 | 8/2015 |
| WO | WO2015170118 A1 | 11/2015 |

OTHER PUBLICATIONS

International Search Report and Written Opinion received for corresponding Patent Cooperation Treaty Application No. PCT/FI2016/050406, dated Oct. 7, 2016, 18 pages.

Extended European Search Report received for corresponding European Patent Application No. 16904531.7, dated Oct. 25, 2019, 7 pages.

Mizuno et al., "Authentication Using Multiple Communication Channels", Proceedings of the 2005 workshop on Digital identity management, Nov. 11, 2005, pp. 54-62.

* cited by examiner

SENSOR-BASED INTERACTION

RELATED APPLICATION

This application was originally filed as PCT Application No. PCT/FI2016/050406 filed Jun. 8, 2016.

FIELD

The present invention relates to sensor-based interaction with a service, such as, for example, a web service.

BACKGROUND

Web services may be useful to users in several ways. For example, hypertext transfer protocol, HTTP, with the world wide web, WWW, may be used to provide users weather, stock market and traffic information.

While some web services, such as weather services, provide information that is equally valid to all persons, or at least all persons in a geographic area, other web services may be customized for specific users. Banking and healthcare are extreme examples of services that must, due to their basic nature, be accessible only by persons authorised to access the services and interact with them.

Web services, be they banking services or extranets, may require signup and logon by users, to ensure no unauthorised access takes place, to ensure relevant information is provided to a user, or both. Signup may comprise providing some personal information and agreeing on a password, for example. Subsequent to signup, logging on may require simply providing the agreed password, for example.

As users habitually access large numbers of services, the number of passwords users need tends to grow, to the extent many users have given up on the notion of memorizing them all and instead rely on passwords or passphrases that are written on paper notes or stored in text files, or various kinds of password management programs.

Users may have personal devices, such as smartphones and smart watches. Other examples include pulse meters and other biomedical measurement devices. Personal devices may be used to access web services, for example by using a web browser program installed in a personal smartphone or tablet device.

Inputting passwords or passphrases in a smartphone or tablet user interface may be cumbersome since these devices may lack a physical keyboard, and passwords may comprise a mix of alphanumeric and special characters.

SUMMARY OF THE INVENTION

The invention is defined by the features of the independent claims. Some specific embodiments are defined in the dependent claims.

According to a first aspect of the present invention, there is provided an apparatus comprising a memory configured to store an identifier of the apparatus, at least one processing core configured to obtain, from sensor information, a service identifier and a session identifier, compile a message addressed to a service provider associated with the service identifier, the message comprising the identifier of the apparatus and the session identifier, and cause transmission of the message toward the service provider.

Various aspects of the first aspect may comprise at least one feature from the following bulleted list:
- the identifier of the apparatus comprises a public encryption key of the apparatus
- the at least one processing core is further configured to cryptographically sign the message prior to causing the transmission of the message
- the apparatus is configured to obtain the sensor information from at least one sensor comprised in the apparatus
- the sensor information comprises optical sensor information originating in an optical sensor
- the sensor information comprises audio sensor information originating in a microphone sensor
- the apparatus is further configured to process a logon message from the service provider, and to respond to the logon message with a logon reply message comprising at least one of: a cryptographic signature and a one-time password
- the apparatus is configured to request an interaction from a user before transmitting the logon reply message
- the interaction comprises at least one of the following: a fingerprint entry, a password entry and performance of a gesture.

According to a second aspect of the present invention, there is provided an apparatus comprising at least one processing core, at least one memory including computer program code, the at least one memory and the computer program code being configured to, with the at least one processing core, cause the apparatus at least to receive, from a service provider, a service identifier and a session identifier, cause the service identifier and the session identifier to be conveyed via at least one of: optical communication and sound communication, and receive, from the service provider, an identifier of a device associated with a user of the apparatus.

Various aspects of the second aspect may comprise at least one feature from the following bulleted list:
- the service identifier and the session identifier are conveyed via a web browser program
- the apparatus is configured to cause the conveying of the service identifier and the session identifier to be stopped responsive to receiving the identifier
- the apparatus is configured to store the identifier of the device associated with the user in a local storage mechanism
- the local storage mechanism comprises at least one of: a browser cookie and a hypertext markup language 5, HTML5, local storage
- the apparatus is further configured to, in connection with a login attempt to a service associated with the service identifier, transmit the identifier of the device associated with the user to a network.

According to a third aspect of the present invention, there is provided a method comprising storing an identifier of an apparatus, obtaining, from sensor information, a service identifier and a session identifier, compiling a message addressed to a service provider associated with the service identifier, the message comprising the identifier of the apparatus and the session identifier, and causing transmission of the message toward the service provider.

Various aspects of the third aspect may comprise at least one feature corresponding to a feature from the preceding bulleted list laid out in connection with the first aspect.

According to a fourth aspect of the present invention, there is provided a method, comprising receiving, in an apparatus, from a service provider, a service identifier and a session identifier, causing the service identifier and the session identifier to be conveyed via at least one of: optical communication and sound communication, and receiving, from the service provider, an identifier of a device associated with a user of the apparatus.

Various aspects of the fourth aspect may comprise at least one feature corresponding to a feature from the preceding bulleted list laid out in connection with the second aspect.

According to a fifth aspect of the present invention, there is provided an apparatus comprising means for storing an identifier of an apparatus, means for obtaining, from sensor information, a service identifier and a session identifier, means for compiling a message addressed to a service provider associated with the service identifier, the message comprising the identifier of the apparatus and the session identifier, and means for causing transmission of the message toward the service provider.

According to a sixth aspect of the present invention, there is provided an apparatus comprising means for receiving, from a service provider, a service identifier and a session identifier, means for causing the service identifier and the session identifier to be conveyed via at least one of: optical communication and sound communication, and means for receiving, from the service provider, an identifier of a device associated with a user of the apparatus.

According to a seventh aspect of the present invention, there is provided a non-transitory computer readable medium having stored thereon a set of computer readable instructions that, when executed by at least one processor, cause an apparatus to at least store an identifier of an apparatus, obtain, from sensor information, a service identifier and a session identifier, compile a message addressed to a service provider associated with the service identifier, the message comprising the identifier of the apparatus and the session identifier, and cause transmission of the message toward the service provider.

According to an eighth aspect of the present invention, there is provided a non-transitory computer readable medium having stored thereon a set of computer readable instructions that, when executed by at least one processor, cause an apparatus to at least receive, from a service provider, in an apparatus, a service identifier and a session identifier, cause the service identifier and the session identifier to be conveyed via at least one of: optical communication and sound communication, and receive, from the service provider, an identifier of a device associated with a user of the apparatus.

According to a ninth aspect of the present invention, there is provided a computer program configured to cause a method in accordance with at least one of the third and fourth aspects to be performed.

EMBODIMENTS

By conveying a service identifier and a session identifier to a personal device using a sensory, for example a visual and/or audio channel, the personal device is enabled to associate its own identity with signup information of the user. This enables a simplified logon procedure later on, making the use of passwords potentially unnecessary.

Figure 1:
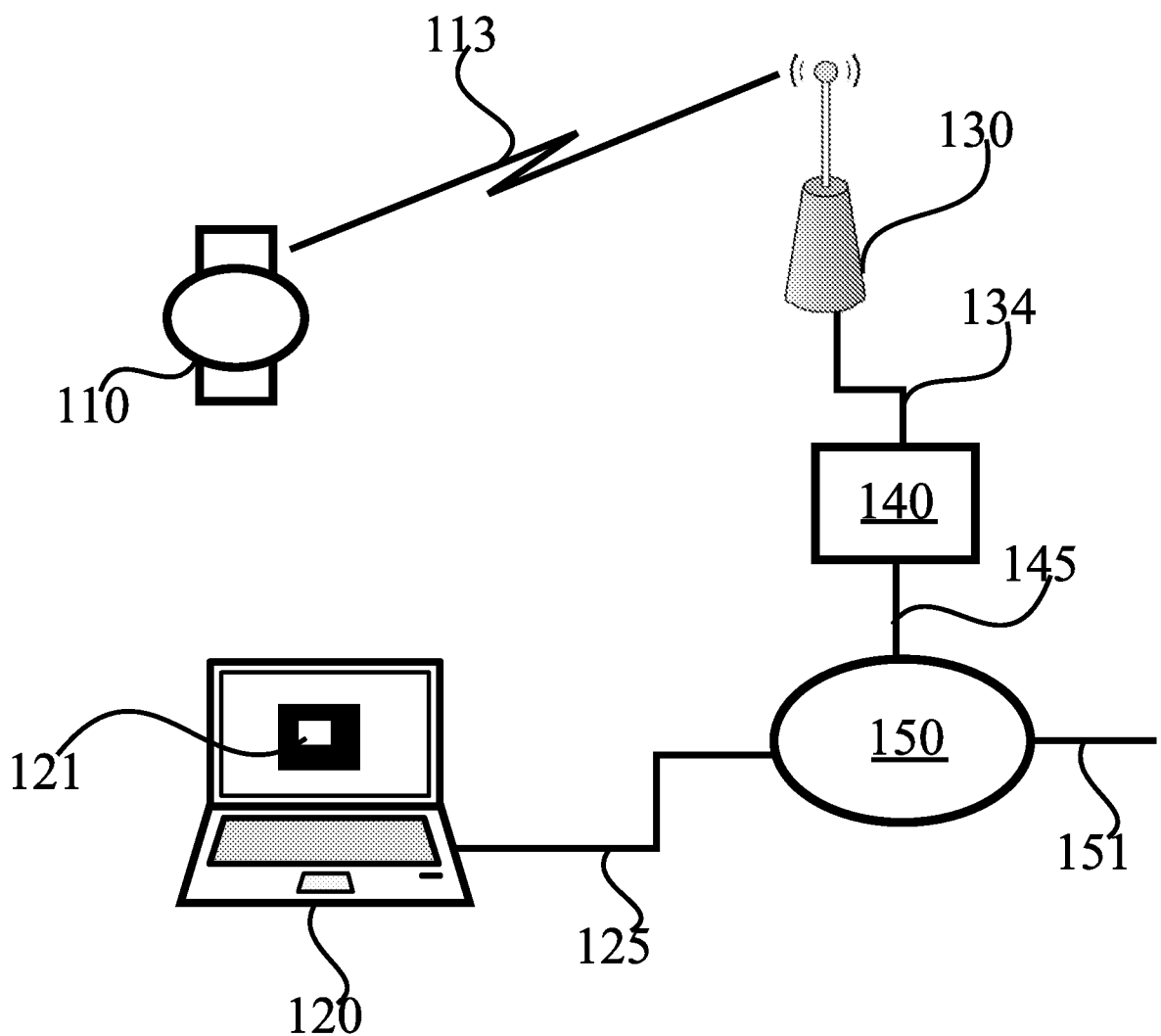
FIG. 1 illustrates an example system in accordance with at least some embodiments of the present invention.

FIG. 1 illustrates an example system in accordance with at least some embodiments of the present invention. The system of FIG. 1 comprises device 110, which may comprise a personal device, such as a wearable device, for example. Device 110 may comprise a watch, smartphone, cellular phone, camera, tablet computer, laptop computer or other suitable device, for example. The system also comprises computer 120, which may comprise a laptop, as illustrated, or a desktop or tablet computer, or a smartphone, for example. Computer 120 is connected to a network 150 via connection 125, which may comprise an Ethernet, wireless and/or optic fibre connection, for example. Network 150 may comprise the Internet or a corporate network, for example. Network 150 may be connected with further networks via connection 151.

Device 110 has connectivity to network 150 via wireless channel 113, access point 130 and network node 140. Wireless channel 113 and access point 130 may operate in accordance with a wireless technology standard, for example Bluetooth, wireless local area network, WLAN, or worldwide interoperability for microwave access, WiMAX. In particular, Bluetooth IPv6 may be used. On the other hand, a cellular technology, such as, for example, long term evolution LTE, or wideband code division multiple access, WCDMA, may be used. Access point 130 is connected with network node 140 via connection 134, and network node 140 is connected with network 150 via connection 145. Connections 134 and 145 may be wired or at least partly wireless. Network node 140 may comprise a gateway or radio access network controller, for example. In some embodiments, device 110 has connectivity to network 150 via a peer-to-peer network instead of the architecture illustrated in FIG. 1.

Device 110 may be furnished with at least one sensor, such as, for example, a photo detector, digital camera sensor and/or microphone. A photo detector is a detector enabled to sense light or other electromagnetic energy. Photo detectors may comprise camera sensors, for example charge-coupled device, CCD, sensors, and simpler sensors of light intensity and/or colour. Device 110 may be configured to obtain sensor information, also known as sensor data, from the at least one sensor. The sensor information characterizes a physical property the sensor is arranged to measure. Thus, for example, a photo detector produces sensor information that characterizes properties of light near device 110, and a microphone produces sensor information that characterizes properties of sound near device 110.

A same user may be the user of device 110 and of computer 120. The user may seek a service, which may be a web service or another kind of remote network service, using computer 120. The service may be provided via connection 125, for example, from a service provider node in network 150, or a network in communication with network 150 via connection 151.

In connection with signup to the service, the service provider transmits to computer 120 a service identifier and a session identifier. These identifiers may be provided in connection with, or comprised in, a web page associated with the service. The service identifier may identify or otherwise be associated with the service. The service identifier may comprise, for example, an internet protocol, IP, address of the service provider node, and/or it may comprise a fully qualified domain name, FQDN, of the service provider node, or another kind of identifier of the service such as a uniform resource locator, URL, for example. The session identifier may comprise a temporary identifier, which may be generated for the access session, for example. Communication between computer 120 and the service provider node may be secured, for example by HTTP over TLS, HTTPS or secure shell, SSH.

In connection with a signup process, computer 120 may render the service identifier and session identifier to device 110. Such rendering may be caused to occur by or via a web browser, for example. This may take place by a visual indication, wherein these two identifiers are encoded using a pre-agreed encoding, to a visual form which may comprise flickering boxes of different colours or sizes, for example. Since the identifiers are of limited length, a bit rate of this rendering may be low, or even very low. The visual form may be black-and-white or it may comprise multiple colours such as white, red, green and blue. In a black-and-white encoding, each of the two colours may signify one bit, {1} or {0}. In a four-colour encoding, each colour may be translated into two bits to form a "constellation" of the colours such that the identifiers may be rendered to device 110 as a sequence comprised of elements {{00}, {01}, {10}, {11}}. A still image of a visual representation is illustrated in FIG. 1 as representation 121. Where the photo detector is a digital camera detector, a more complex pattern, such as a two-dimensional QR code, may be used to convey the identifiers.

The visual representations of the identifiers may be received by a photo detector of device 110. The photo detector may produce sensor information that characterizes the visual representations, enabling device 110 to determine the service identifier and the session identifier.

Additionally, or alternatively to a visual rendering, an audio rendering may be used by computer 120, wherein the two identifiers are provided to device 110 via at least one loudspeaker. Audio representations of the identifiers may comprise bursts of sound at different frequencies. Where applicable, the frequencies may be in the ultrasound range, to minimize discomfort to the user. For example, there may be four frequency ranges defined in the encoding, such that each of the four ranges corresponds to one element in the set {{00}, {01}, {10}, {11}}. Thus an identifier comprised of sixteen bits may be communicated as a set of eight consecutive tones. A simpler embodiment uses a sequence of sound on, sound off like Morse code, to convey the identifiers. Broadband noise may be emitted at the same time as tones used to convey the identifiers, to make the tones less disturbing to a user. A further alternative is to include the tones within an audio logo or musical motif.

The audio representations of the identifiers may be received via a microphone of device 110. The microphone may produce sensor information that characterizes the audio representations, enabling device 110 to determine the service identifier and the session identifier.

In some embodiments, both visual and audio representations are used, and where it seems that a first one of the visual and audio representation is unreliable, for example due to background noise or a faulty sensor, a second one of the visual and audio representation is used to convey the service identifier and the session identifier to device 110. In general, where both visual and audio representations are used, device 110 may compare the service identifier and the session identifier as received over these representations. In case both identifiers are received identically over both kinds of representation, device 110 may be confident the identifiers have been correctly received.

As a yet further communication option, communication between computer 120 and device 110 may take place in an electromagnetic near-field. In such embodiments, the sensor in device 110 may comprise a capacitive touchscreen, for example. In such embodiments, for example, electrical signals may be created at or by computer 120 and device 110 may sense them.

In the signup process, once device 110 has the service identifier and the session identifier, it may resolve the service provider node, for example the IP address of the service provider node. For example, where the service identifier is a FQDN, device 110 may resolve the IP address of the service provider node by performing a DNS query with the FQDN identifier.

Device 110 may then compile and transmit a message to the service provider node. This message may comprise, for example, the session identifier and an identifier of device 110. Optionally, it may also comprise a communication method and/or a signature. The communication method may comprise a communication method device 110 prefers the service provider node to use, when communicating with device 110. For example, device 110 may prefer to be contacted via a central server. The signature may comprise a cryptographic signature calculated over contents of the message. The identifier of device 110 may comprise a FQDN or other name of device 110 and/or a public key of device 110. Where the message does not comprise a public key of device 110, the service provider node may be enabled by the identifier of device 110 to retrieve the public key from a public key repository, for example.

Once the service provider node is in receipt of the message from device 110, the service provider node may associate, using the session identifier, the identifier of device 110 with the user of computer 120 and/or a user account of this user in the service. The service provider node may provide an indication to computer 120, that computer 120 may cease providing the service identifier and the session identifier to device 110, since device 110 has already received these identifiers. Computer 120 may provide the identifiers repeatedly until the service provider node, for example, instructs it to stop. Repeated provision of the identifiers makes their reception by device 110 easier. The service provider node may store the identifier of device 110 in connection with user information of the user for subsequent logon processes. The signup process may conclude once the service provider node has the identifier of device 110. The service provider node may provide the identifier of device 110 to computer 120, which may store it, for example in a browser cookie or HTML5 storage.

In a subsequent logon process, the user accesses the service, for example using computer 120. Computer 120 may provide the identifier of device 110 to the service provider node in connection with the logon process, enabling the service provider node to, optionally, compare the identifier of device 110 received from computer 120 to a copy of the identifier of device 110 it stores from the signup process. The service provider node may transmit a message to device 110, based at least partly on the identifier of device 110, requesting a response. In case computer 120 does not provide the identifier of device 110 to the service provider node in connection with the logon process, the service provider node may use a copy of the identifier of device 110 it has stored from a prior signup process. This may provide the advantage that the user may logon using a different computer than the one used in the signup process.

Device 110, responsive to the message from the service provider node, may compile a message that is cryptographically signed and/or comprises a one-time password. Where the message is cryptographically signed, it may be signed with a private key of device 110, such that the service provider node may verify the signature using the public key of device 110. The message from device 110 may comprise a nonce received from the service provider node, to prevent replay type attacks since the signature would be computed also over the nonce, which may change each time a logon is performed. Responsive to successfully verifying the cryptographic signature is correct, the service provider node may consider the user logged in to the service, thus obviating a need for the user to provide a password. An indication of this may be provided to the computer requesting the logon.

In some embodiments, device 110 is configured to request a user action before providing the message comprising the signature or one-time password to the service provider node. For example, device 110 may request the user to provide a fingerprint to a fingerprint sensor comprised in device 110, or to accept a prompt which asks, if the user wants to log in to the service. This way, the user can decline an attempt by an attacker to use computer 120 to log in to the service when the user is absent.

In case the message from device 110 to the service provider node comprises the one-time password, device 110 may indicate this one-time password to the user on a screen of device 110, for example. The service provider node may then prompt the user of the computer being used for the logon for this password. In case the same user used both device 110 and the computer, the user is able to provide this password. On the other hand, in case the logon attempt is spurious, the user seeking to log on will not know the password, and the logon will fail.

Figure 2:
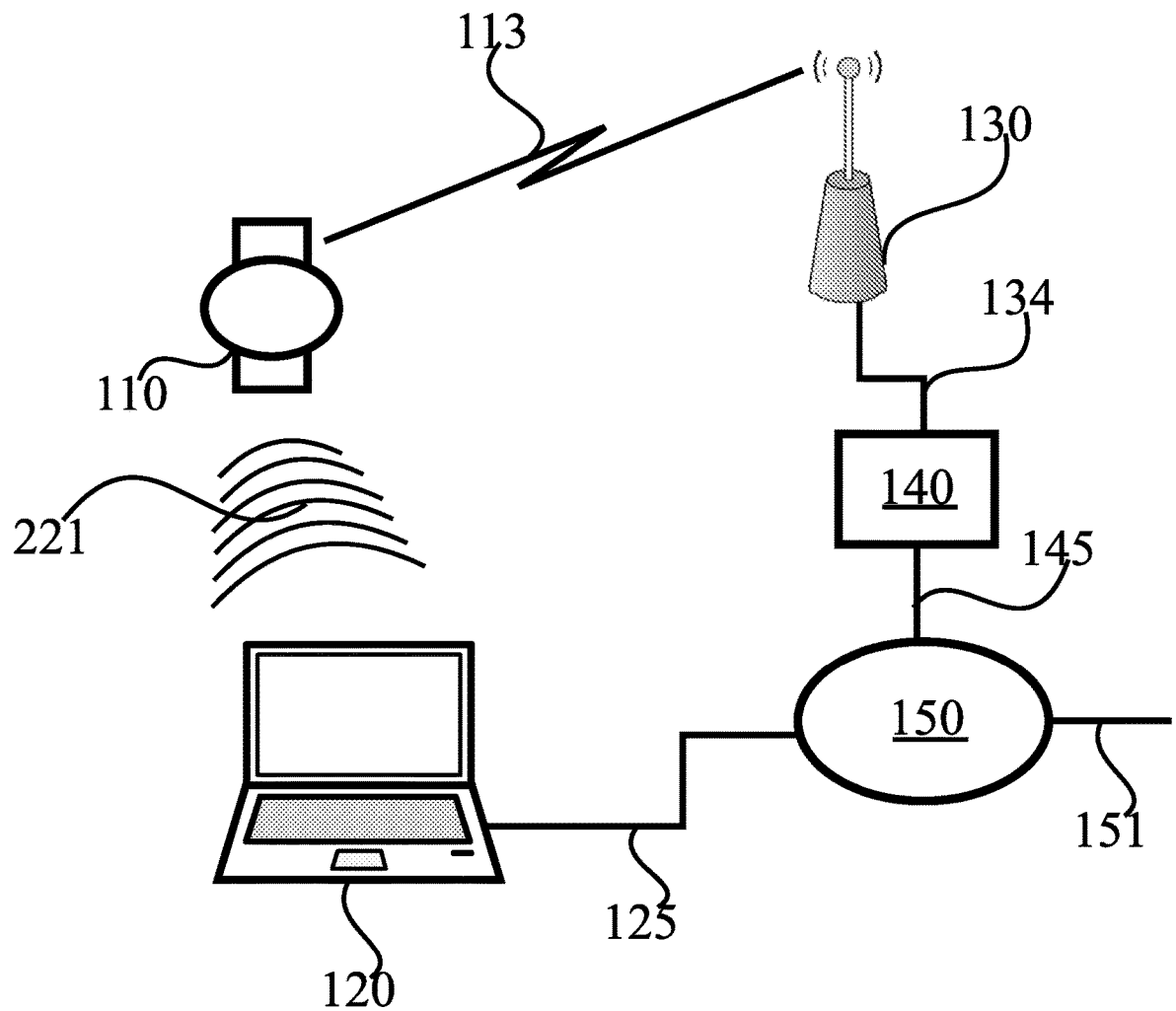
FIG. 2 illustrates an example system in accordance with at least some embodiments of the present invention.

FIG. 2 illustrates an example system in accordance with at least some embodiments of the present invention. Like numbering denotes like structure as in FIG. 1. A difference to the system illustrated in FIG. 1 is that instead of visual representation 121, an audio representation 221 is employed to convey the service identifier and the session identifier from computer 120 to device 110. Audio representation 221 is emitted from at least one loudspeaker of computer 120, for reception in at least one microphone in device 110.

Figure 3:
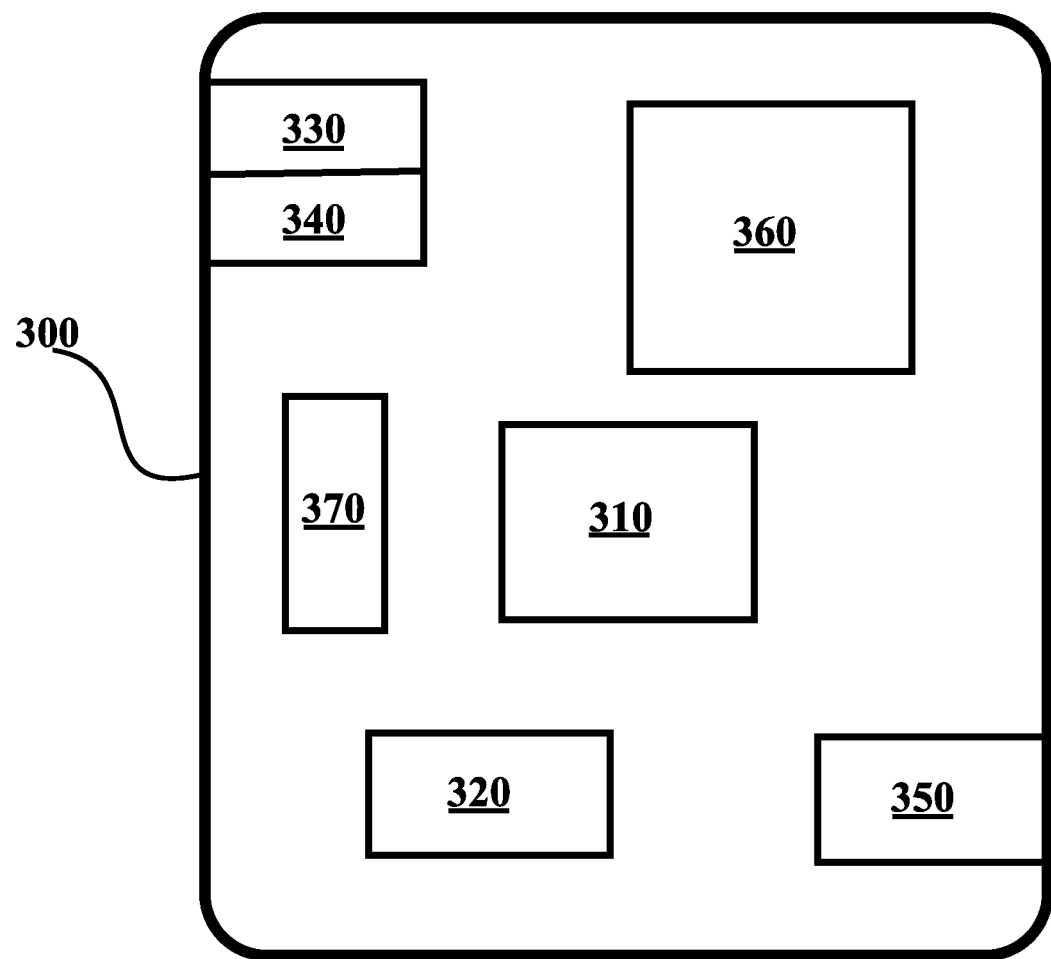
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a device such as device 110 of FIG. 1 or FIG. 2, or, in applicable parts, computer 120. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a CORTEX-A8 processing core manufactured by ARM HOLDINGS or a STEAMROLLER processing core produced by ADVANCED MICRO DEVICES CORPORATION. Processor 310 may comprise at least one QUALCOMM SNAPDRAGON and/or INTEL ATOM processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to initiate login requests.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise, processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
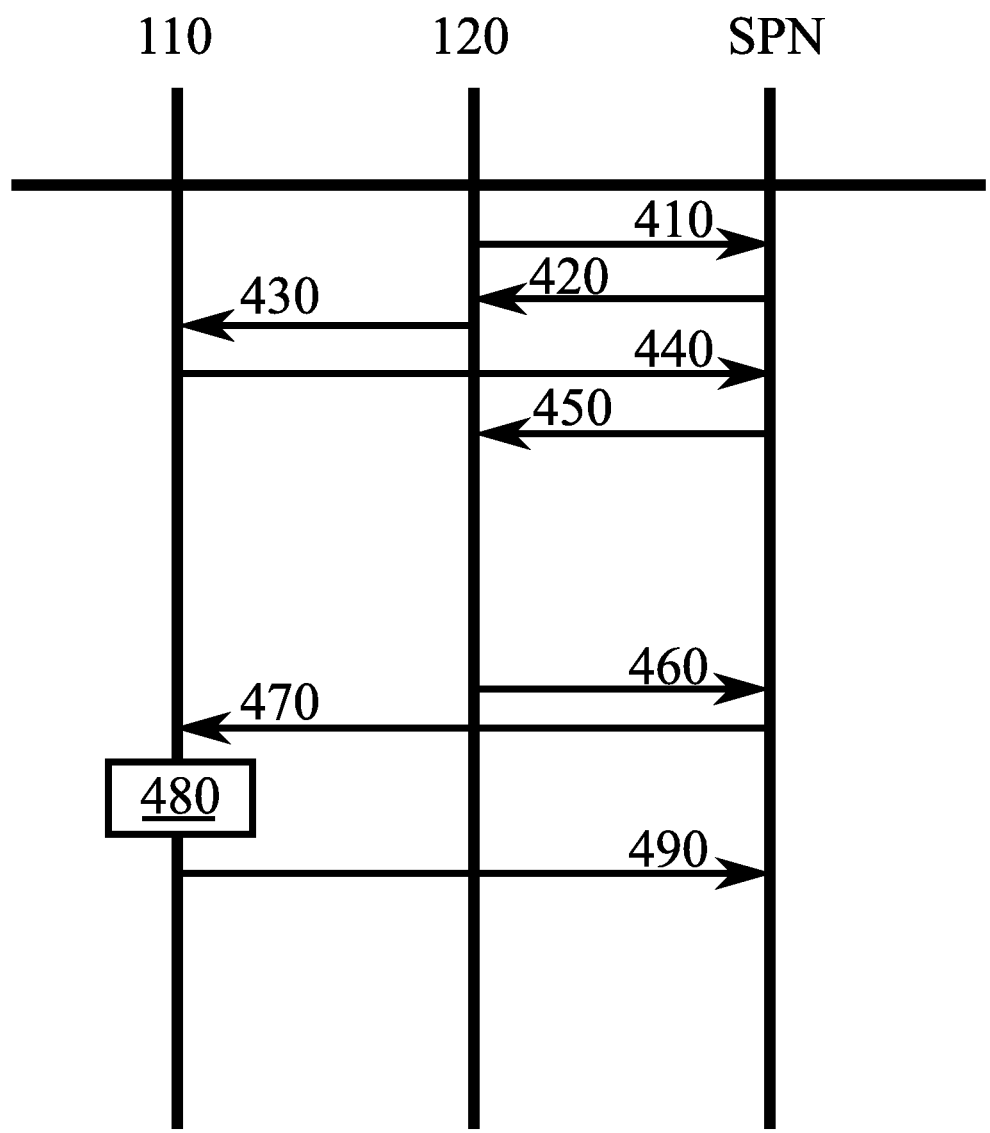
FIG. 4 illustrates signalling in accordance with at least some embodiments of the present invention.

FIG. 4 illustrates signalling in accordance with at least some embodiments of the present invention. On the vertical axes are disposed, on the left, device 110 of FIG. 1 and FIG. 2, in the centre, computer 120 of FIG. 1 and FIG. 2 and on the right, service provider node SPN. Time advances from the top toward the bottom. FIG. 4 illustrates a signup process comprising phases 410 to 450, and a logon process comprising phases 460 to 490. These processes need not take place immediately one after another, or even between the same devices, in particular, a different computer may be used for the logon process where service provider node SPN stored the identifier of device 110, as described above.

In phase 410 computer 120 requests the service from service provider node SPN. In response, service provider node SPN provides the service identifier and the session identifier to computer 120, in phase 420. Service provider node SPN may randomly or pseudo-randomly generate the session identifier as a response to phase 410.

In phase 430, computer 120 provides the service identifier and the session identifier to device 110, using a sensor-readable representation as described above. For example, the representation may be a visual and/or an audio representation. Once device 110 has the service identifier and the session identifier, it may transmit a message 440 to service provider node SPN, wherein this message comprises the session identifier and an identifier of device 110, as described above. This message may optionally further comprise a cryptographic signature of device 110 and/or a preferred communication method identifier.

Once in possession of the identifier of device 110, service provider node SPN may store a copy of it and, optionally, transmit it to computer 120, in phase 450, which may conclude the signup process, which overall comprises phases 410-450.

Phases 460-490 are comprised in a logon process, distinct from the signup process. In phase 460, computer 120 seeks to log the user on to the service provided by service provider node SPN. The message of phase 460 may comprise the identifier of device 110, stored in computer 120 in connection with a prior signup process. Alternatively, where e.g. the user seeks to log on from a different computer, this message needn't comprise the identifier of device 110 but may comprise an identity of the user or his account. In phase 470, service provider node SPN transmits a message to device 110, requesting a signed response from device 110. The message of phase 470 may comprise a nonce, to be included in the signed response. Where the message of phase 460 doesn't comprise the identifier of device 110, service provider node SPN may use, in sending the message of phase 470, a copy of the identifier stored locally in service provider node SPN in connection with a prior signup process.

In phase 480, device 110 may compile a response message for transmission to service provider node SPN. In this phase, device 110 may request a user input, as described above. Device 110 may sign the response message using a private key of device 110, which may be stored locally in device 110, for example. In phase 490, the response message, which as described above may comprise a cryptographic signature, is provided to service provider node SPN, which may verify the cryptographic signature, or one-time password used instead of the cryptographic signature, to complete the logon process.

Figure 5:
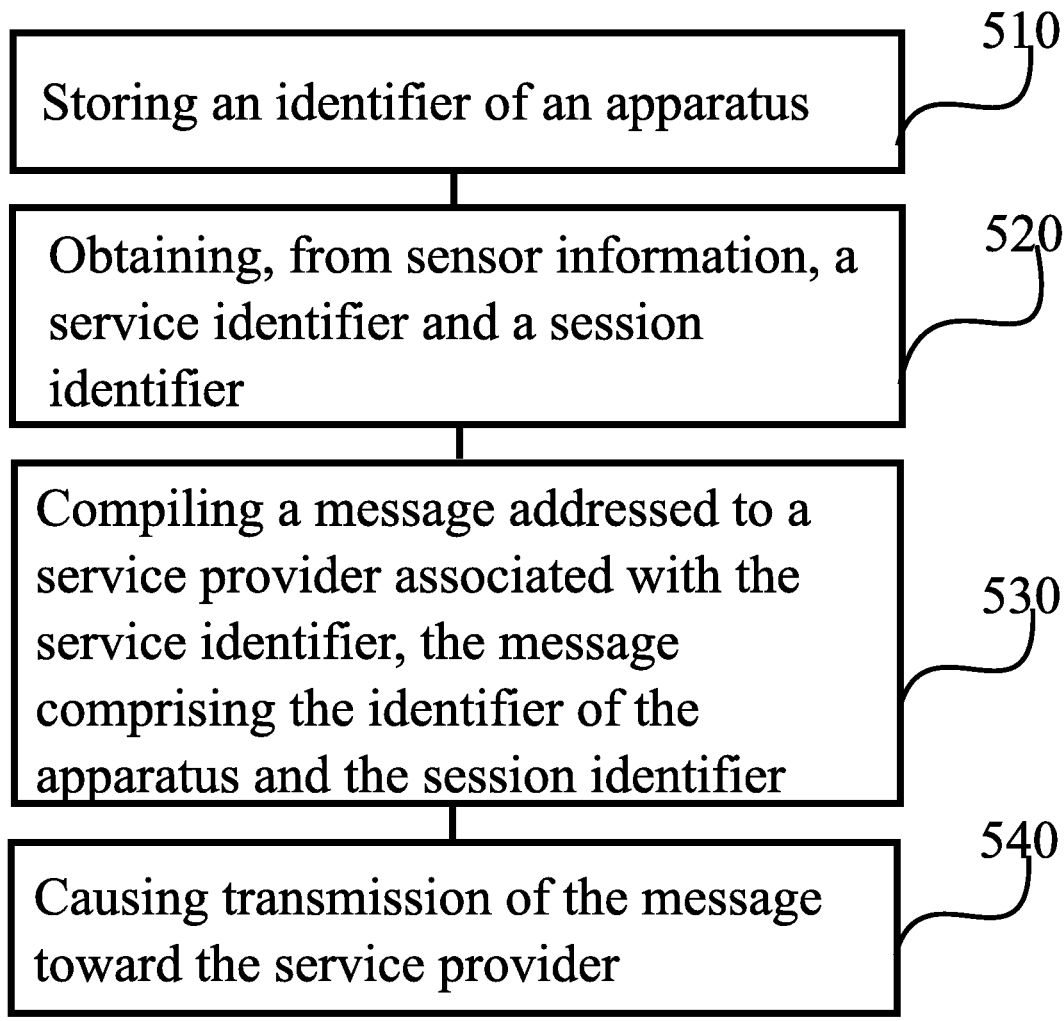
FIG. 5 is a flow graph of a method in accordance with at least some embodiments of the present invention.

FIG. 5 is a flow graph of a method in accordance with at least some embodiments of the present invention. The phases of the illustrated method may be performed in device 110, or in a control device configured to control the functioning thereof, when implanted therein.

Phase 510 comprises storing an identifier of an apparatus. Phase 520 comprises obtaining, from sensor information, a service identifier and a session identifier. Phase 530 comprises compiling a message addressed to a service provider associated with the service identifier, the message comprising the identifier of the apparatus and the session identifier. Phase 540 comprises causing transmission of the message toward the service provider.

Figure 6:
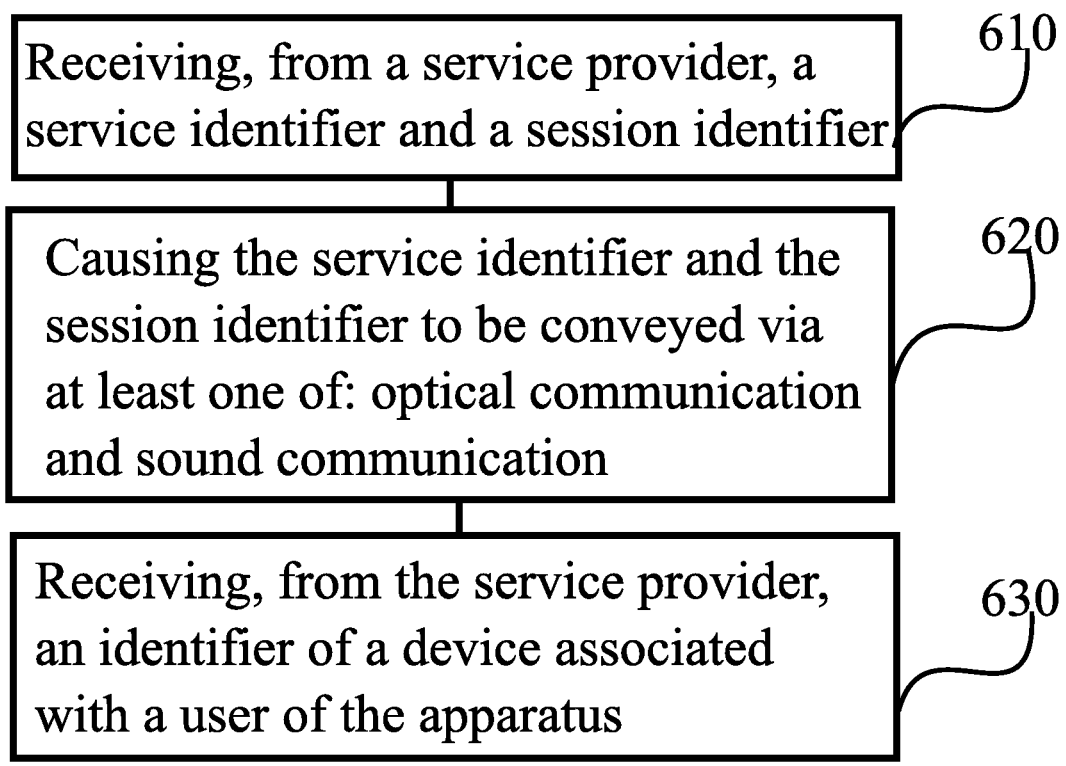
FIG. 6 is a flow graph of a method in accordance with at least some embodiments of the present invention.

FIG. 6 is a flow graph of a method in accordance with at least some embodiments of the present invention. The phases of the illustrated method may be performed in computer 120, or in a control device configured to control the functioning thereof, when implanted therein Phase 610 comprises receiving, from a service provider, a service identifier and a session identifier. The receiving may take place in an apparatus. Phase 620 comprises causing the service identifier and the session identifier to be conveyed via at least one of: optical communication and sound communication. Finally, phase 630 comprises receiving, from the service provider, an identifier of a device associated with a user of the apparatus.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in computer networking.

ACRONYMS LIST

CCD charge-coupled device
DNS domain name system
FQDN fully qualified domain name
HTTP hypertext transfer protocol
HTTPS HTTP over TLS
HTML hypertext markup language
IP internet protocol
IPv6 IP version 6
LTE long term evolution
TLS transport layer security
URL uniform resource locator
WCDMA wideband code division multiple access
WiMAX worldwide interoperability for microwave access
WLAN wireless local area network
WWW world wide web

REFERENCE SIGNS LIST

| 110 | Device |
| 120 | Computer |
| 130 | Access point |
| 140 | Network node |

-continued

REFERENCE SIGNS LIST

| 150 | Network |
| 113 | Wireless channel |
| 134, 145, 125, 151 | Connections |
| 121 | Visual representation |
| 221 | Audio representation |
| 300-370 | Structure of the apparatus of FIG. 3 |
| 410-490 | Phases of the processes of FIG. 4 |
| 510-540 | Phases of the method of FIG. 5 |
| 610-630 | Phases of the method of FIG. 6 |

The invention claimed is:

1. An apparatus comprising at least one processing core, at least one memory including computer program code, the at least one memory and the computer program code being configured to, with the at least one processing core, cause the apparatus at least to:
   store an identifier of the apparatus;
   obtain, separately from both audio and video sensor information, a service identifier and a session identifier, the service identifier comprising an internet protocol address of a service provider, a fully-qualified domain name of the service provider or a uniform resource locator of the service provider, and compare the service identifier and the session identifier as received in the audio and the video sensor information to each other;
   compile, in case the service identifier and the session identifier as received in the audio and the video sensor information are identical, a message addressed to the service provider identified by the service identifier, the message comprising the identifier of the apparatus and the session identifier;
   cause transmission of the message toward the service provider;
   process a logon message from the service provider;
   request an interaction from a user of the apparatus, and in response to the interaction from the user, respond to the logon message with a logon reply message comprising at least one of: a cryptographic signature and a one-time password, wherein the logon reply message comprises the one-time password.

2. The apparatus according to claim 1, wherein the identifier of the apparatus comprises a public encryption key of the apparatus.

3. The apparatus according to claim 1, wherein the at least one processing core is further configured to cryptographically sign the message prior to causing the transmission of the message.

4. The apparatus according to claim 1, wherein the apparatus is configured to obtain the sensor information from at least one sensor comprised in the apparatus.

5. The apparatus according to claim 1, wherein the sensor information comprises optical sensor information originating in an optical sensor.

6. The apparatus according to claim 1, wherein the sensor information comprises audio sensor information originating in a microphone sensor.

7. The apparatus according to claim 1, wherein the interaction comprises at least one of the following: a fingerprint entry, a password entry and performance of a gesture.

8. A method comprising:
   storing an identifier of an apparatus;

obtaining, separately from both audio and video sensor information, a service identifier and a session identifier, the service identifier comprising an internet protocol address of a service provider, a fully-qualified domain name of the service provider or a uniform resource locator of the service provider, and comparing the service identifier and the session identifier as received in the audio and the video sensor information to each other;

compiling, in case the service identifier and the session identifier as received in the audio and the video sensor information are identical, a message addressed to the service provider identified by the service identifier, the message comprising the identifier of the apparatus and the session identifier;

causing transmission of the message toward the service provider;

processing a logon message from the service provider;

requesting an interaction from a user of the apparatus, and in response to the interaction from the user, responding to the logon message with a logon reply message comprising at least one of: a cryptographic signature and a one-time password, wherein the logon reply message comprises the one-time password.

9. The method according to claim 8, wherein the sensor information is obtained from at least one sensor comprised in the apparatus.

10. A non-transitory computer readable medium having stored thereon a set of computer readable instructions that, when executed by at least one processor, cause an apparatus to at least:

store an identifier of an apparatus;

obtain, separately from both audio and video sensor information, a service identifier and a session identifier, the service identifier comprising an internet protocol address of a service provider, a fully-qualified domain name of the service provider or a uniform resource locator of the service provider, and compare the service identifier and the session identifier as received in the audio and the video sensor information to each other;

compile, in case the service identifier and the session identifier as received in the audio and the video sensor information are identical, a message addressed to the service provider identified by the service identifier, the message comprising the identifier of the apparatus and the session identifier;

cause transmission of the message toward the service provider;

process a logon message from the service provider;

request an interaction from a user of the apparatus, and in response to the interaction from the user, respond to the logon message with a logon reply message comprising at least one of: a cryptographic signature and a one-time password, wherein the logon reply message comprises the one-time password.

* * * * *